United States Patent [19]

Laurito

[11] 4,056,498
[45] Nov. 1, 1977

[54] PRODUCTION OF NOVEL RESINS AND THEIR USES IN PRINTING INK COMPOSITIONS

[75] Inventor: James J. Laurito, Coraopolis, Pa.

[73] Assignee: Neville Chemical Company, Pittsburgh, Pa.

[21] Appl. No.: 434,270

[22] Filed: Jan. 17, 1974

[51] Int. Cl.$^2$ .............................................. C09F 1/04
[52] U.S. Cl. ............................... 260/23.7 C; 260/101; 526/290
[58] Field of Search .................... 260/23.7 C, 101; 160/88.2 E; 526/290

[56] References Cited

U.S. PATENT DOCUMENTS

| 1,982,707 | 12/1934 | Thomas | 260/23.7 C |
|---|---|---|---|
| 2,538,103 | 1/1951 | Koonce | 260/101 |
| 2,540,776 | 2/1951 | Cadwell | 260/101 |
| 2,608,550 | 8/1952 | Rowland et al. | 260/27 BB |
| 3,299,034 | 1/1967 | Nishiara | 260/101 |
| 3,804,788 | 4/1974 | Funaoka et al. | 260/27 R |
| 3,935,145 | 1/1976 | Rudolphy | 260/27 BB |
| 3,937,674 | 2/1976 | Laarkamp | 260/196 A |
| 3,984,381 | 10/1976 | Tsuchiya et al. | 260/23 AR |

FOREIGN PATENT DOCUMENTS 715,228  9/1954  United Kingdom ............ 260/23.7 C

OTHER PUBLICATIONS

Neville DS-AB-901; Dec. 1972 "Nevroz 1520 Resin for Printing Inks" 5 pages.

Primary Examiner—Eugene C. Rzucidlo
Attorney, Agent, or Firm—Burns, Doane, Swecker & Mathis

[57] ABSTRACT

Synthetic resins suitable for use in printing ink compositions are produced by forming a base resin by polymerizing a reaction mixture consisting essentially of (a) a predominate amount of dicyclopentadiene and lesser amounts of (b) a mixture of dimerized conjugated aliphatic cyclic and non-cyclic dienes of five carbon atoms, and (c) tall oil. In a separate reaction the base resin is modified through a reaction with an ethylenically unsaturated lower aliphatic dicarboxylic acid or anhydride, such an maleic anhydride.

15 Claims, No Drawings

PRODUCTION OF NOVEL RESINS AND THEIR USES IN PRINTING INK COMPOSITIONS

BACKGROUND OF THE INVENTION

1. Field of the Invention

This invention relates generally to synthetic resins suitable for printing ink compositions and to processes for their production.

2. Summary of the Prior Art

Hydrocarbon resins suitable for a wide variety of end uses including coatings, asphalt floor tile, and printing ink compositions have been known for many years. See, for example, U.S. Pat. Nos. 2,598,424; 3,290,275; 3,299,034; 3,468,837; 3,523,095 and 3,775,381; and "Recent Developments In Hydrocarbon Resins", K. E. Jackson, Official Digest, pp. 372-385, May 1956; and "Synthetic Resins for Inks", John P. Petrone, The American Inkmaker, Vol. 49 (Mar.-Oct. 1971).

The search has continued, however, for new synthetic resins having improved properties, particularly in the printing ink industry which has searched for a suitable replacement for rosin and rosin derivatives in heat set and gravure printing ink compositions. The present invention was made as a result of that search.

SUMMARY OF THE INVENTION

Accordingly, a primary object of the present invention is to provide novel synthetic resins suitable for use in compositions such as printing inks.

Another object of the present invention is to provide novel processes for producing synthetic resins suitable for use in compositions such as printing inks.

These and other objects will be apparent to one skilled in this art from the following:

In accordance with one aspect of the present invention, a dibasic acid-modified hydrocarbon/tall oil resin is provided, which modified resin consists essentially of the reaction production of at least one ethylenically unsaturated lower aliphatic dicarboxylic acid or anhydride, such as maleic anhydride, with a base resin. The base resin consists essentially of a polymerized mixture of: (a) a predominate amount of dicyclopentadiene; and lesser amounts of b) a mixture consisting essentially of dimerized conjugated aliphatic, cyclic and non-cyclic dienes of five carbon atoms, and (c) tall oil.

In a more particular aspect of the present invention, a maleic-modified hydrocarbon/tall oil resin is provided, which maleic-modified resin is particularly suitable for use in heat-set and gravure printing ink compositions. The maleic modified resin consists essentially of the reaction product of from about three to five parts maleic anhydride with about 97 to 95 parts of a base resin. This base resin consists essentially of a polymerized mixture of:

a. from about 50% to about 75% of dicyclopentadiene or a dicyclopentadiene-rich hydrocarbon fraction containing at least about 70% dicyclopentadiene and minor amounts of methyl dicyclopentadiene and codimers cyclopentadiene and methyl cyclopentadiene;

b. from about 5 to about 20% of a mixture consisting essentially of from about 70 to about 90% dimers of isoprene, cis-piperylene and trans-piperylene and codimers, trimers and cotrimers of isoprene, cis-piperylene, trans-piperylene and cyclopentadiene and from about 30 to 10% of higher polymers of isoprene, cis-piperylene, transpiperylene and cyclopentadiene; and c. from about 10 to about 30% refined tall oil consisting essentially of a predominate amount of tall oil fatty acids and a lesser amount of tall oil rosin acids.

In another aspect of the present invention, a process is provided for producing a dibasic acid-modified hydrocarbon/tall oil resin. The process is essentially a two-step process which comprises:

1. Copolymerizing a reaction mixture consisting essentially of:
 a. a predominate amount of dicyclopentadiene: and lesser amounts of
 b. mixture consisting essentially of dimerized conjugated aliphatic cyclic and non-cyclic dienes of five carbon atoms, and
 c. tall oil, to form a base resin; and 2. Reacting the base resin with at least one ethylenically unsaturated lower aliphatic dicarboxylic acid or anhydride in an amount sufficient to produce a modified resin having an acid number higher than the acid number of the base resin.

In another more particular aspect of the present invention, a process is provided for producing a maleic-modified hydrocarbon/tall oil resin suitable for use in heat-set and gravure printing ink compositions. The central features of this process are the following two steps:

1. Reacting at a temperature of from about 230° C to about 270° C and at autogenous pressure and under agitation a mixture consisting essentially of (a) from about 50 to about 75% of dicyclopentadiene or a dicyclopentadiene-rich hydrocarbon fraction containing at least about 70% dicyclopentadiene and minor amounts of methyl dicyclopentadiene and codimers of cyclopentadiene and methyl cyclopentadiene; (b) from about 5 to about 20% of a mixture consisting essentially of from about 70 to about 90% dimers of isoprene, cis-piperylene and trans-piperylene and codimers, trimers and cotrimers of isoprene, cis-piperylene, transpiperylene and cyclopentadiene and from about 30 to about 10% higher polymers of isoprene, cis-piperylene, trans-piperylene and cyclopentadiene; and (c) from about 10 to about 30% refined tall oil consisting essentially of a predominate amount of tall oil fatty acids and a lesser amount of tall oil rosin acids, to produce a base resin having a Ring and Ball softening point of from about 130° C to about 160° C and an Acid Number of less than about 5; and 2. Reacting at a temperature of from about 200° C to about 240° C and under an inert gas blanket from about three to five parts of maleic anhydride and from about 97 to about 95 parts of the base resin until a maleic-modified resin having a Ring and Ball softening point of from about 130° C to 170° C, a color (Barrett) of up to about 2, an Acid Number of from about 15 to about 30, and Gardner-Holdt solution viscosities at 25° C (bubble seconds) of from about 2.65 to about 8.0 (60% resin in 47 Kauri butanol gravure ink solvent) and from about 20 to about 60 (50% resin in 31 Kauri butanol heat set ink solvent), is produced.

The central feature of the present invention is the discovery of a novel synthetic resin having properties desirable for use in printing ink compositions, including heat set inks and gravure inks. These properties include (i) reasonably high soft points, e.g., between about 130° C and 160° C (Ring and Ball); (ii) light color, e.g., up to about 3, and more typically less than about 2 (Barrett method); (iii) reasonably high solubility in the relatively poor solvents typically used in inks, e.g., Magie 470 oil (heat set) or 45 Kauri butanol gravure ink solvent; (iv) the ability to "wet" pigments in ink formulas (thought to be a function of the Acid Number of a resin); and (v) a reasonably high solution viscosity in relatively low solvent power ink solvents at 50 to 60% resin concentration (the importance of this property is pointed up by the fact that in certain instances the ink industry requires a relatively viscous paste ink consistency for application, and in other instances may wish a substantially less viscous ink formulation). Moreover, the resin of the present invention can be used as the sole resin or in combination with or as an extender for other resins in both heat set ink compositions and gravure ink compositions. And in such printing ink compositions, the resins of the present invention have also been found to give improved solvent release and improved gloss, as well as giving excellent ink drawdowns (Meyer Bar), and decreased odor.

Other aspects and advantages of the present invention will become apparent to one skilled in this art from the following description of the preferred embodiments.

DESCRIPTION OF THE PREFERRED EMBODIMENTS

As indicated above, the novel synthetic resins of the present invention are produced by a process including forming a base resin by polymerizing a reaction mixture consisting essentially of (a) a predominate amount of dicyclopentadiene and lesser amounts of (b) a mixture of dimerized conjugated aliphatic cyclic and non-cyclic dienes of five carbon atoms, and (c) tall oil.

Dicyclopentadiene is well known per se. A substantially pure, e.g., 95 to essentially 100%, dicyclopentadiene feed stock may be used. Alternatively, dicyclopentadiene-rich hydrocarbon fraction may also be used. Typically, such dicyclopentadiene-rich hydrocarbon fractions contain at least about 40%, and more typically at least about 70% dicyclopentadiene and minor or lesser amounts, e.g., from about 1 to about 30%, of methyl dicyclopentadiene and codimers of cyclopentadiene and methyl cyclopentadiene. Small amounts, e.g., less than about 5%, of other materials such as benzene and which do not materially affect the performance of the dicyclopentadiene-rich hydrocarbon fraction as used in the present invention, may also be present in such dicylopentadiene-rich hydrocarbon fractions.

As also indicated above, the dicyclopentadiene is present in the initial reaction mixture in a predominate amount, i.e., in an amount greater than either of the other two principal components of the reaction mixture. For example, the dicyclopentadiene may be present in the reaction mixture in an amount from about 40 to about 85%, and more preferably in an amount from about 50 to about 75%, based on the total weight of the three principal components in the reaction mixture.

The second principal component in the initial reaction mixture is itself a mixture of dimerized conjugated aliphatic, cyclic and noncyclic dienes of five carbon atoms, e.g., a mixture consisting essentially of dimers of isoprene, cis-piperylene and trans-piperylene and codimers, trimers and cotrimers of isoprene, cis-piperylene, trans-piperylene and cyclopentadiene. More particularly, a typical second component mixture may consist essentially of from about 70 to about 90% dimers of isoprene, cis-piperylene and trans-piperylene and codimers, trimers and cotrimers of isoprene, cis-piperylene, trans-piperylene and cyclopentadiene and from about 30 to about 10% higher polymers of isoprene, cis-piperylene, trans-piperylene and cyclopentadiene. Feed stocks of this type are described in more detail in U.S. Pat. No. 3,290,275 and U.S. Pat. No. 3,478,005, both of which are incorporated herein by reference.

The dimerized $C_5$ diene mixture is typically present in an amount substantially less than the dicyclopentadiene component. For example, the dimerized $C_5$ diene mixture may be present in an amount from about 5 to about 30%, and more preferably from about 5 to about 20%, of the total weight of the three principal components in the initial reaction.

The third principal component in the initial reaction mixture is tall oil. The tall oil composition typically utilized is refined tall oil, i.e., crude tall oil which has been refined such as by distillation. The refined tall oil typically consists essentially of a predominate amount of tall oil fatty acids and a lesser amount of tall oil rosin acids. For example, the refined tall oil may contain from about 50% to about 70% fatty acids, and from about 30% up to less than about 50% rosin acids. Other tall oil compositions containing, for example, from about 10% to about 90% fatty acids and from about 90% to about 10% rosin acids may also be used. Tall oil and particularly refined or distilled tall oil is well known per se and the manner in which it is produced, derived or obtained is not a part of the present invention.

The tall oil may be present in the initial reaction mixture in an amount less than that of the dicyclopentadiene reactant component and, for example, may be present in an amount from about 10 to about 35%, based on the total weight of the three principal reactive components. Preferably, the tall oil is present in an amount from about 10 to about 30% by weight of the reaction mixture.

Typically, the above-described three principal reactants or components (dicyclopentadiene or dicyclopentadiene-rich fraction, dimerized $C_5$ diene mixture, and tall oil) comprise at least about 80% of the total amount of polymerizable constituents or monomers of the reaction mixture, preferably comprise above about 90% of the total amount of polymerizable constituents of the reaction mixture, and most preferably comprise essentially 100% of the total amount of polymerizable constituents of the reaction mixture.

The initial reaction mixture containing the dicyclopentadiene, dimerized $C_5$ diene mixture and tall oil may be polymerized over a wide range of temperatures as can be seen by one skilled in the art in view of the disclosure herein. For example, reaction temperatures may range from about 200° C up to about 290° C, and preferably from about 230° C to about 270° C.

The pressures employed in the initial reaction zone to produce the base resin are not thought to be critical, with the pressure sufficient to prevent substantial loss by evaporation of the reactants typically being used. Subatmospheric, atmospheric and superatmospheric pressures may be employed, and autogenous pressure in a substantially sealed reaction vessel is typically convenient.

If desired, inert diluents such as toluene or benzene may also be present in the reaction zone or mixture in an amount for example, of up to about thirty percent based on the total weight of the reaction mixture including the diluent.

Any conventional reactor vessel may be employed for this initial polymerization reaction, and the polymerization reaction may be conducted in a batch, semicontinuous or continuous manner. Preferably, the polymerization reaction is carried out under agitation, e.g., in a stirred reactor vessel.

This initial polymerization reaction is typically characterized as a thermal polymerization and most preferably is conducted in the absence of any catalyst.

The initial reaction mixture of dicyclopentadiene, dimerized C$_5$ diene mixture and tall oil is typically maintained at reaction temperature until the desired degree of polymerization is reached. Typically, reaction is mainained until a base resin having a Ring and Ball softening point of from about 110° C to about 170° C, more typically about 130° C to about 160° C, and an Acid Number of less than about ten, and preferably less than about five, is produced. For example, reaction time may be from about twelve to about thirty-six hours and preferably from about sixteen to about twenty-four hours.

The resulting hydrocarbon/tall oil base resin in typically recovered from the reaction mixture by conventional methods such as distillation, e.g., steam distillation or stripping; such recovery techniques are well known to those skilled in this art.

The resulting base resin may be used directly in various coating and/or printing compositions, but preferably is thereafter reacted with at least one ethylenically unsaturated lower aliphatic dicarboxylic acid or anhydride in an amount sufficient to produce a modified resin having an Acid Number higher than the Acid Number of the base resin. The higher Acid Number value is desirable for sufficient "wetting" of ink pigments in ink compositions, and the dibasic acid-modified resin typically also exhibits an increased Ring and Ball softening point and an increased solution viscosity in relatively low solvent power ink solvents at 50 to 60% resin concentration.

The ethylenically unsaturated lower aliphatic dicarboxylic acid or anhydrides found suitable include maleic anhydride and fumaric acid. Maleic anhydride is most preferred and has been found to yield a modified resin having the best combination of properties for usage in heat set and gravure printing ink compositions. Other ethylenically unsaturated lower aliphatic dicarboxylic acids or anhydrides which may be suitable include among others glutaconic acid, itaconic acid, citraconic acid, mesaconic acid and tetrahydrophthalic anhydride.

As indicated above, the base resin is reacted with the ethylenically unsaturated dicarboxylic acid or anhydride under conditions sufficient to increase the Acid Number of the base resin.

For example, from about one to 10 parts of at least one ethylenically unsaturated lower aliphatic dicarboxylic acid may be reacted with about 99 to about 90 parts of the base resin, and preferably from about three to about five parts of the dicarboxylic acid or anhydride are reacted with about 97 to about 95 parts of the base resin.

The reaction between the dicarboxylic acid and the base resin may be conducted over a wide range of temperatures depending upon the specific dicarboxylic acid chosen and the specific base resin used. For example, reaction temperatures from about 180° C to about 250° C, and preferably from about 200° C to about 240° C, may be used. The reaction also is typically carried out in the absence of any catalyst, although a free radical initiator, such as an organic peroxide may be used.

The reaction pressures employed are not thought to be critical, with the pressure sufficient to prevent substantial loss by evaporation of the reactants typically being used. Subatmospheric, atmospheric and superatmospheric pressures may be employed. Most preferably, the reaction is conducted under substantially oxygen-free conditions to prevent darkening of the color of the resulting resin. Conveniently, the reaction can be conducted under an inert gas blanket such as by passing nitrogen or carbon dioxide gas through the reactor vessel and over the reaction mixture. Any conventional stirred or non-stirred reactor vessel may be employed for the reaction, the reaction may be conducted in a batch, semicontinuous or continuous manner.

The reaction between the anhydride or acid and the base resin is typically maintained at reaction temperature until the desired Acid Number is reached. Typically, the reaction will be maintained for a period sufficient to produce a modified resin having a Ring and Ball softening point of from about 110° C to about 180° C, a color (Barret) of less than about three, and an Acid Number (mg. KOH/gm. resin) of from about 10 to about 40, and preferably having a Ring and Ball softening point of from about 130° C to about 160° C, a color (Barret) of up to about two, an Acid Number of from about 15 to about 30, and Gardner-Holdt solution viscosities at 25° C (bubble seconds) of from about 1.65 to about 9.0, preferably 2.65 to about 8.0 (60% resin in 47 Kauri butanol gravure ink solvent) and from about 10 to about 1000, preferably about 20 to about 60 (50% resin in 31 Kauri butanol heat set ink solvent). For example, reaction times may range from about 1 hour to about 10 hours, and more typically may range from about 3 to about 6 hours.

"Acid Number" as used herein refers to a colorimetric method wherein approximately one gram of the resin is dissolved in 50 ml. of an acid number solution consisting of two parts of technical grade toluene, one part of technical grade isopropyl alcohol and a few drops of phenophthalein indicator. The resin solution is then titrated with 0.1 N alcoholic potassium hydroxide solution (methyl) to a slight pink color. The Acid Number is then calculated as follows:

Acid Number = ((ml. KOH Soln.) × (5.61)/(gms. resin))

The modified resin may then be recovered from the reaction mixture by conventional methods such as distillation, e.g., steam distillation or stripping, or other conventional recovery methods known to those skilled in this art.

The novel resins of the present invention may be characterized as dibasic acid-modified hydrocarbon/tall oil resins. The resins typically have a Ring and Ball softening point (ASTM E-28) of from about 110° C to about 180° C, and more typically from about 130° C to about 170° C, and a resin color of not more than about three, and more typically less than about two (Barrett visual method No. 106). Molecular weight (number average) may range from about 500 to about 1500, and more typically from about 900 to about 1100. The resin may also have a degree of unsaturation corresponding to an iodine number of between about 100 and about 200, more typically from about 125 to about 150 (ASTM D-1959, Wijs). Specific gravity at 25° C may range from about 1.01 to about 1.15, more tyically from about 1.05 to about 1.15. The resin is soluble in a wide variety of solvents including typical aliphatic hydrocarbon solvents such as mineral spirits, n-heptane, methyl cyclohexane, n-hexane, and n-decane. Advantageously, the acid modified resins of the present invention are soluble in gravure and heat set inks. Gravure inks are generally thin and non-oily. Their viscosity range is generally from 100 to 300 centipoise, and these inks are often extended with whiting, china clay or other inexpensive fillers. Heat set inks have a wide range of consistency which can range from being very thick or viscous down to about 500 centipoise viscosity, which is generally suitable for high speed rotary presses.

As indicated above, the acid modified resins of the present invention also exhibit "wetting" properties for ink pigments, and will release the ink solvent rapidly and completely at drying temperatures.

To be used in printing, the resins of this invention are dissolved with an appropriate solvent and carbon black or other desired colorant and other conventional ingredients such as solid extenders, auxiliary polymeric binders and other functional organic or inorganic compounds may be included in the vehicle which is composed of resin dissolved in a hydrocarbon solvent which is usually aliphatic in nature. The preferred solvents for heat set inks are highly refined hydrocarbon oils which are relatively high boiling and boil within a relatively narrow range, e.g., between about 230° and 330° C. Particularly preferred are essentially aliphatic solvents which have a boiling range that does not extend over more than about a 50° C interval, e.g., between above 250° and about 300° C, and which have a Kauri butanol value of less than about 40 milliliters and preferably less than 35 milliliters (as compared to a value of 105 milliliters for toluene). In making up an ink composition, the hydrocarbon resin and carbon black or other pigment in powder form may be placed in a ball mill together with the solvent and mixed until a uniform dispersion of the pigment in the hydrocarbon solution is obtained. If desired, it is possible to prepare an ink concentrate in this fashion which is only subsequently diluted with additional solvent to the concentration appropriate for use in the printing operation. Typically, for instance, an ink composition used in a printing operation may contain between about 10% and about 50% of the resin, between about 100 to 200 parts of carbon black or other pigment or colorant per 100 parts of resin, the balance consisting essentially of an aliphatic hydrocarbon solvent.

The invention will next be illustrated in terms of specific examples. In these examples, as well as in the other parts of the present specification and appended claims, it should be understood that all amounts and proportions of materials are expressed on a weight basis unless otherwise indicated.

EXAMPLE I

In this run approximately 72.2% dicyclopentadiene-rich hydrocarbon fraction, 13.7% dimerized $C_5$ diene mixture and 14.2% distilled tall oil were fed to a stirred reactor having a total capacity of 13,000 gallons and a working capacity of 11,500 gallons. The dicyclopentadiene-rich hydrocarbon fraction had a composition of approximately 75% dicyclopentadiene and approximately 25% of methyl dicyclopentadiene and codimers of cyclopentadiene and methyl cyclopentadiene; the dimerized $C_5$ diene mixtures consisted essentially of about 75% by weight of dimers of isoprene, cispiperylene and trans-piperylene, and codimers, trimers and cotrimers of isoprene, cis-piperylene, trans-piperylene and cyclopentadiene, and about 25% by weight of higher polymers of isoprene, cispiperylene, trans-piperylene and cyclopentadiene (solid as Chemex 1116); and the distilled tall oil contained approximately 51% monomeric fatty acids, approximately 8% dimerized fatty acids, approximately 6% esterified fatty acids, approximately 33% rosin acids, and approximately 2% unsaponifiables. The distilled tall oil had a Gardner number (ASTM D-1544) of about 7, and an Acid Number of about 180; saponification number was about 186, and specific gravity at 25° C was 0.95.

The reaction mixture was agitated and heated for approximately 24 hours at about 255° C (the reaction mixture was raised to 255° C over an approximate 6 hour period). At the end of the reaction period, the reaction vessel was vented to remove volatiles, and thereafter steam distilled at 255° C and atmospheric pressure until a base resin having a Ring and Ball softening point of about 143° C was obtained.

Approximately 97 parts by weight of the base resin were then reacted with about 3 parts by weight of maleic anhydride briquettes (2½ by 1½ inches) under an inert nitrogen blanket at a temperature of 210° C for three hours under agitation.

The resulting maleic-modified hydrocarbon/tall oil resin was found to have a calculated weight percent composition of about 72% polymerized dicyclopentadiene fraction, about 8.3% polymerized dimerized $C_5$ diene, approximately 16.7% polymerized tall oil and approximatley 3% reacted maleic anhydride. This maleic modified hydrocarbon/tall oil resin was further found to have a Ring and Ball softening point of 154° C, a color (Barret) of ½+, an Acid Number (milligrams KOH/grams resin) of 20.7, molecular weight (number average) of 1020, a Gardner-Holdt solution viscosity at 25° C (bubble second) of 32.7 (50% resin in Magie 470 heat set ink solvent) and a Gardner-Holdt solution viscosity at 25° C (bubble seconds) of 2.65–3.20 (60% resin in 47 Kauri butanol gravure ink solvent.) Magie 470 gravure ink solvent has a specific gravity at 15.6° C of 0.832, a Kauri butanol value of 31.2, and an Engler distillation (°C) of I.B.P.−256; 50%−270; and E.P. −303.

A typical heat set ink formula utilizing this maleic modified hydrocarbon/tall oil resin consists of 55.7% resin varnish which in turn consists of 50% of the maleic modified resin in Magie 470 heat set ink solvent, 12.8% aluminum hydrate, 8.6% Phthalocyanine Blue, 2.15% polyethylene wax, and an additional 20.75% Magie 470 heat set ink solvent.

A typical gravure ink formula utilizing the maleic-modified resin consists of 50% resin solution which in turn consists of 60% maleic modified resin in 47 Kauri butanol gravure ink solvent, 15% Duplex Barium Lithol Red pigment, 5% ethyl cellulose solution which in turn consists of 25% ethyl cellulose in isopropanol, 10% "VM&P" naphtha hydrocarbon solvent and 2% toluene.

EXAMPLE II

This Example consists of four different runs utilizing the same procedure as set forth in Example I as follows:

In these four runs the reactor utilized for the initial reaction was an unagitated bench scale-unit having a total capacity of 1000 cc's and a working capacity of 750 cc's, the bench scale-unit being heated electrically. In all four runs the initial reaction was carried out for 16 hours at 250° C, with the time required for the reaction mixture to reach 250° C being approximately three hours. After this reaction period, the bench scale-reactor was cooled to 140° C and the contents transferred to a bench scale-distillation unit for steam distillation at 250° C to recover the base resin. The base resin was thereafter reacted with maleic anhydride for three hours at about 225° C under a nitrogen inert gas blanket and under agitation.

In Run 1, the feed stock to the initial reaction zone consisted of 60% of the dicyclopentadiene-rich hydrocarbon fraction, 19.7% of the dimerized $C_5$ diene mixture, and 20.3% of the distilled tall oil.

In Run 2, the feed stock to the initial reaction zone consisted of 70% of the dicyclopentadiene-rich hydrocarbon fraction, 9.7% of the dimerized $C_5$ diene mixture, and 20.3% of the distilled tall oil.

In Run 3, the feed stock to the initial reaction zone consisted of 70% of the dicyclopentadiene-rich hydrocarbon fraction, 14.7% of the dimerized $C_5$ diene mixture, and 15.3% of the distilled tall oil.

In Run 4, the feed stock to the initial reaction zone consisted of 70% of the dicyclopentadiene-rich hydrocarbon fraction, 19.7% of the dimerized $C_5$ diene mixture, and 10.3% of the distilled tall oil.

In Run 1, the resulting base resin had a Ring and Ball softening point of 117° C and 95 parts of the base resin were reacted with five parts of maleic anhydride to yield a maleic modified resin having a Ring and Ball softening point of 130° C, a color (Barret) of 1½+, an Acid Number of 29.8, and Gardner-Holdt solution viscosity of 10 in the Magie 470 ink solution and 1.85 in the 47 Kauri butanol gravure ink solution.

In Run 2, the resulting base resin had a Ring and Ball softening point of 139° C and an Acid Number of 4.5. 95 parts of the base resin were reacted with five parts of maleic anhydride to yield a maleic modified resin having a Ring and Ball softening point of 154° C, a color (Barrett) of 1½+, an Acid Number of 27.4, and Gardner-Holdt solution viscosity of 60 in the Magie 470 ink solution and 4.00–5.00 in the 47 Kauri butanol gravure ink solution.

In Run 3, the resulting base resin had a Ring and Ball softening point of 146° C, and 97 parts of the base resin were reacted with three parts of maleic anhydride to yield a maleic modified resin having a Ring and Ball softening point of 151° C, a color (Barrett) of 1½+, an Acid Number of 17.5, and Gardner-Holdt solution viscosity of 21 in the Magie 470 ink solution and 2.65 in the 47 Kauri butanol gravure ink solution.

In Run 4, the resulting base resin had a Ring and Ball softening point of 152° C and an Acid Number of 1.5. In this run, 95 parts of the base resin were reacted with five parts of maleic anhydride to yield a maleic modified resin having a Ring and Ball softening point of 158° C, a color (Barrett) of two, an Acid Number of 26.4, and Gardner-Holdt solution viscosity of 23.3 in the Magie 470 ink solution and 2.65–3.20 in the 47 Kauri butanol gravure ink solution.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

I claim:

1. A dibasic acid-modified hydrocarbon/tall oil resin suitable for use in heat-set and gravure printing ink compositions which resin consists essentially of the reaction product of at least one ethylenically unsaturated lower aliphatic dicarboxylic acid or anhydride with a base resin consisting essentially of a polymerized mixture of: (a) a predominant amount of dicyclopentadiene; and lesser amounts of (b) a mixture consisting essentially of dimerized aliphatic cyclic and non-cyclic dienes of five carbons, and (c) tall oil; the dibasic acid-modified resin having Gardner-Holdt solution viscosities at about 25° C (bubble seconds) of from about 1.65 to about 9.0 (60% in 45 Kauri butanol gravure ink solvent) and from about 10 to about 1000 (50% in 31 Kauri butanol heat set ink solvent).

2. A modified resin according to claim 1 and having a Ring and Ball softening point of from about 110° C to about 180° C, a color (Barrett) of less than about three, and an Acid Number (mg.KOH/gm. resin) of from about ten to about forty.

3. A modified resin according to claim 1 consisting essentially of the reaction product of from about one to about ten parts of maleic anhydride or fumaric acid with about ninety-nine to about ninety parts of the base resin.

4. A modified resin according to claim 3 wherein the base resin consists essentially of a polymerized mixture of: (a) from about forty to about eighty-five percent dicyclopentadiene; (b) from about five to about thirty percent of a mixture consisting essentially of dimers of isoprene, cis-piperylene and trans-piperylene and codimers, trimers and cotrimers of isoprene, cis-piperylene, trans-piperylene and cyclopentadiene, and (c) from about ten to about thirty-five percent refined tall oil.

5. A maleic-modified hydrocarbon/tall oil resin suitable for use in heat-set and gravure printing ink compositions, which resin has a Ring and Ball softening point of from about 130° C to 170° C, a color (Barrett) of up to about two, and Acid Number of from about fifteen to about 30, and Gardner-Holdt solution viscosities at about 25° C (bubble seconds) of from about 2.65 to about 8.0 (60% in 47 Kauri butanol gravure ink solvent) and from about 20 to about 60 (50% in 31 Kauri butanol heat set ink solvent), and which resin consists essentially of the reaction product of from about three to five parts maleic anhydride with about ninety-seven to ninety-five parts of a base resin consisting essentially of a polymerized mixture of: (a) from about fifty to about seventy-five percent of dicyclopentadiene or a dicyclopentadiene-rich hydrocarbon fraction containing at least about seventy percent dicyclopentadiene and minor amounts of methyl dicyclopentadiene and codimers of cyclopentadiene and methyl cyclopentadiene; (b) from about five to about twenty percent of a mixture consisting essentially of from about seventy to about ninety percent dimers of isoprene, cis-piperylene and trans-piperylene and codimers, trimers and cotrimers of isoprene, cis-piperylene, trans-piperylene and cyclopentadiene and from about thirty to ten percent higher polymers of isoprene, cis-piperylene, trans-piperylene and cyclopentadiene; and (c) from about ten to about thirty percent refined tall oil consisting essentially of a predominant amount of tall oil fatty acids and a lesser amount of tall oil rosin acids.

6. A process for producing a dibasic acid-modified hydrocarbon/tall oil resin suitable for use in heatset and gravure printing ink compositions, which process comprises:

1. copolymerizing a reaction mixture consisting essentially of:
    a. a predominant amount of dicyclopentadiene; and lesser amounts of
    b. a mixture consisting essentially of dimerized aliphatic cyclic and non-cyclic dienes of five carbon atoms, and
    c. tall oil,
to form a base resin; and
2. reacting the base resin with at least one ethylenically unsaturated lower aliphatic dicarboxylic acid or anhydride in an amount sufficient to produce a modified resin having an acid number higher than the acid number of the base resin, the modified resin having Gardner-Holdt solution viscosities at about 25° C (bubble seconds) of from about 1.65 to about 9.0 (60% in 47 Kauri butanol gravure ink solvent) and from about 10 to about 1000 (50% in 31 Kauri butanol heat set ink solvent).

7. A process according to claim 6 wherein:
in step (1) the copolymerization is conducted at a temperature of from about 200° C to about 290° C for about 12 to about 36 hours and the reaction mixture is under agitation, and
in step (2) the reaction is conducted at a temperature of from about 180° C to about 250° C for about 1 to 10 hours and under an inert gas blanket.

8. A process according to claim 6 wherein in step (2) from about one to ten parts of maleic anhydride or fumaric acid are reacted with about ninety-nine to about ninety parts of the base resin.

9. A process according to claim 8 wherein the base resin consists essentially of a polymerized mixture of: (a) from about forty to about eighty-five percent dicyclopentadiene; (b) from about five to about thirty percent of a mixture consisting essentially of dimers of isoprene, cis-piperylene and trans-piperylene and codimers, trimers and cotrimers of isoprene, cis-piperylene, trans-piperylene and cyclopentadiene, and (c) from about ten to about thirty-five percent refined tall oil.

10. A process for producing a maleic-modified hydrocarbon/tall oil resin suitable for use in heat-set and gravure printing ink compositions, which process comprises: (1) at a temperature of from about 230° C to 270° C and at autogenous pressure and under agitation, reacting a mixture consisting essentially of: (a) from about fifty to about seventy-five percent of dicyclopentadiene or a dicyclopentadiene-rich hydrocarbon fraction containing at least about seventy percent dicyclopentadiene and minor amounts of methyl dicyclopentadiene and codimers of cyclopentadiene and methyl cyclopentadiene; (b) from about five to about twenty percent of a mixture consisting essentially of from about seventy to about ninety percent dimers of isoprene, cis-piperylene and trans-piperylene and codimers, trimers and cotrimers of isoprene, cis-piperylene, trans-piperylene and cyclopentadiene; and (c) from about ten to about thirty percent refined tall oil consisting essentially of a predominate amount of tall oil fatty acids and a lesser amount of tall oil rosin acids, to produce a base resin having a Ring and Ball softening point of from about 130° C to about 160° C and an Acid Number of less than about five; and (2) reacting at a temperature of from about 200° C to about 240° C and under an inert gas blanket from about three to five parts of maleic anhydride and about ninety-seven to ninety-five parts of the base resin until a maleic-modified resin having a maleic-modified hydrocarbon/tall oil resin suitable for use in heat-set and gravure printing ink compositions, which resin has a Ring and Ball softening point of from about 130° C to 170° C, a color (Barrett) of up to about two, and Acid Number of from about fifteen to about 30, and Gardner-Holdt solution viscosities at about 25° C (bubble seconds) of from about 2.65 to about 8.0 (60% in 47 Kauri butanol gravure ink solvent) and from about 20 to about 60 (50% in 31 Kauri butanol heat set ink solvent) is produced.

11. A process according to claim 10 wherein in step (1) the reaction time is from about sixteen to about twenty-four hours and in step (2) the reaction time is from about three to about six hours.

12. A base resin suitable for use in heat-set and gravure ink printing compositions, and which base resin consists essentially of a polymerized mixture of: (a) a predominant amount of dicyclopentadiene; and lesser amounts of (b) a mixture consisting essentially of dimerized aliphatic cyclic and non-cyclic dienes of five carbon atoms, and (c) tall oil; the dibasic acid-modified resin having Gardner-Holdt solution viscosities at about 25° C (bubble seconds) of from about 1.65 to about 9.0 (60% in 47 Kauri butanol gravure ink solvent) and from about 10 to about 1000 (50% in 31 Kauri butanol heat set ink solvent).

13. A base resin suitable for use in heat-set and gravure printing ink compositions, and which base resin consists essentially of a polymerized mixture of: (a) from about fifty to about seventy-five percent of dicyclopentadiene or a dicyclopentadiene-rich hydrocarbon fraction containing at least about seventy percent dicyclopentadiene and minor amounts of methyl dicyclopentadiene and codimers of cyclopentadiene and methyl cyclopentadiene; (b) from about five to about twenty percent of a mixture consisting essentially of from about seventy to about ninety percent dimers of isoprene, cis-piperylene and trans-piperylene and codimers, trimers and cotrimers of isoprene, cis-piperylene, trans-piperylene and cyclopentadiene and from about thirty to ten percent higher polymers of isoprene, cis-piperylene, trans-piperylene and cyclopentadiene; and (c) from about ten to about thirty percent refined tall oil consisting essentially of a predominant amount of tall oil fatty acids and a lesser amount of tall oil rosin acids o produce a base resin having a Ring and Ball softening point of from about 130° C to about 160° C and an Acid Number of less than about five; and having Gardner-Holdt solution viscosities at about 25° C (bubble seconds) of from about 1.65 to about 9.0 (60% in 47 Kauri butanol gravure ink solvent) and from about 10 to about 1000 (50% in 31 Kauri butanol heat set ink solvent).

14. A process of producing a base resin suitable for use in heat-set and gravure printing ink compositions, which process comprises:
copolymerizing a reaction mixture consisting essentially of:
    a. a predominant amount of dicyclopentadiene; and lesser amounts of
    b. a mixture consisting essentially of dimerized aliphatic cyclic and non-cyclic dienes of five carbon atoms, and
    c. tall oil, form a base resin having Gardner-Holdt solution viscosities at about 25° C (bubble seconds) of from about 1.65 to about 9.0 (60% in 47 Kauri butanol gravure ink solvent) and from about 10 to about 1000 (50% in 31 Kauri butanol heat set ink solvent).

15. A process for producing a base resin suitable for use in heat-set and gravure printing ink compositions, which process comprises: at a temperature of from about 230° C to 270° C and at autogenous pressure and under agitation, reacting a mixture consisting essentially of: (a) about fifty to about seventy-five percent of dicyclopentadiene or a dicyclopentadiene-rich hydrocarbon fraction containing at least about seventy percent dicyclopentadiene and minor amounts of methyl dicyclopentadiene and codimers of cyclopentadiene and methyl cyclopentadiene; (b) from about five to about twenty percent of a mixture consisting essentially of from about seventy to about ninety percent dimers of isoprene, cis-piperylene and trans-piperylene and codimers, trimers and cotrimers of isoprene, cis-piperylene, trans-piperylene and cyclopentadiene; and (c) from about ten to about thirty percent refined tall oil consisting essentially of a predominant amount of tall oil fatty acids and a lesser amount of tall oil rosin acids, to produce a base resin having a Ring and Ball softening point of from about 130° C to about 160° C and an Acid Number of less than about five; and Gardner-Holdt solution viscosities at about 25° C (bubble seconds) of from about 1.65 to about 9.0 (60% in 47 Kauri butanol gravure ink solvent) and from about 10 to about 1000 (50% in 31 Kauri butanol heat set ink solvent).

* * * * *